United States Patent
Sato et al.

(10) Patent No.: US 8,423,369 B2
(45) Date of Patent: Apr. 16, 2013

(54) CONVERSATIONAL SPEECH ANALYSIS METHOD, AND CONVERSATIONAL SPEECH ANALYZER

(75) Inventors: Nobuo Sato, Kokubunji (JP); Yasunari Obuchi, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/232,125

(22) Filed: Sep. 14, 2011

(65) Prior Publication Data

US 2012/0004915 A1 Jan. 5, 2012

Related U.S. Application Data

(63) Continuation of application No. 11/705,756, filed on Feb. 14, 2007, now Pat. No. 8,036,898.

(30) Foreign Application Priority Data

Feb. 14, 2006 (JP) ................... 2006-035904

(51) Int. Cl.
*G10L 21/00* (2006.01)
(52) U.S. Cl.
USPC ............... 704/270; 704/257; 704/9; 704/272
(58) Field of Classification Search ........... 704/245, 704/243, 244, 250, 270, 272, 9, 251, 255, 704/257
See application file for complete search history.

(56) References Cited

U.S. PATENT DOCUMENTS

| | | | |
|---|---|---|---|
| 6,091,334 A * | 7/2000 | Galiana et al. | 340/576 |
| 6,606,111 B1 | 8/2003 | Kondo et al. | |
| 6,748,356 B1 * | 6/2004 | Beigi et al. | 704/245 |
| 6,964,023 B2 | 11/2005 | Maes et al. | |
| 7,117,157 B1 | 10/2006 | Taylor et al. | |
| 7,319,745 B1 | 1/2008 | Firestone | |
| 7,570,752 B2 | 8/2009 | Jachner | |
| 2005/0131697 A1 | 6/2005 | Brown et al. | |
| 2005/0209848 A1 | 9/2005 | Ishii | |
| 2006/0006865 A1 | 1/2006 | Zhang et al. | |
| 2006/0282317 A1 * | 12/2006 | Rosenberg | 705/14 |
| 2007/0071206 A1 * | 3/2007 | Gainsboro et al. | 379/168 |
| 2007/0188901 A1 | 8/2007 | Heckerman et al. | |

FOREIGN PATENT DOCUMENTS

| | | |
|---|---|---|
| JP | 2001-108123 | 4/2001 |
| JP | 2004-112518 | 4/2004 |

OTHER PUBLICATIONS

Sturm, J., Iqbal, R., Kulyk, O., Wang, J., Terken, J.: Peripheral Feedback on Participation Level to Support Meetings and Lectures. In: Designing Pleasurable Products Interfaces (DPPI), Eindhoven Technical University Press (2005).*
D. Gatica-Perez, I. McCowan, D. Zhang, and S. Bengio, "Detecting Group Interest-Level in Meetings", IDIAP Research Report 04-51, Sep. 2004.
Mikic, I. et al. "Activity Monitoring and Summarization for an Intelligent Meeting Room," IEEE Workshop on Human Motion, Austin Texas, Dec. 2000.
McCowan, L.: Gatica-Perez, D.; Bengio, S.; Lathoud G.; Barnard M.; Zhang, D.; "Automatic analysis of multimodal group actions in meetings," Pattern Analysis and Machine Intelligence, IEEE Transactions on, Issue Date: Mar. 2005 vol. 27 Issue: 3 on pp. 305-317.

* cited by examiner

*Primary Examiner* — Huyen X. Vo
(74) *Attorney, Agent, or Firm* — Antonelli, Terry, Stout & Kraus, LLP.

(57) ABSTRACT

The invention provides a conversational speech analyzer which analyzes whether utterances in a meeting are of interest or concern. Frames are calculated using sound signals obtained from a microphone and a sensor, sensor signals are cut out for each frame, and by calculating the correlation between sensor signals for each frame, an interest level which represents the concern of an audience regarding utterances is calculated, and the meeting is analyzed.

19 Claims, 15 Drawing Sheets

FIG. 2
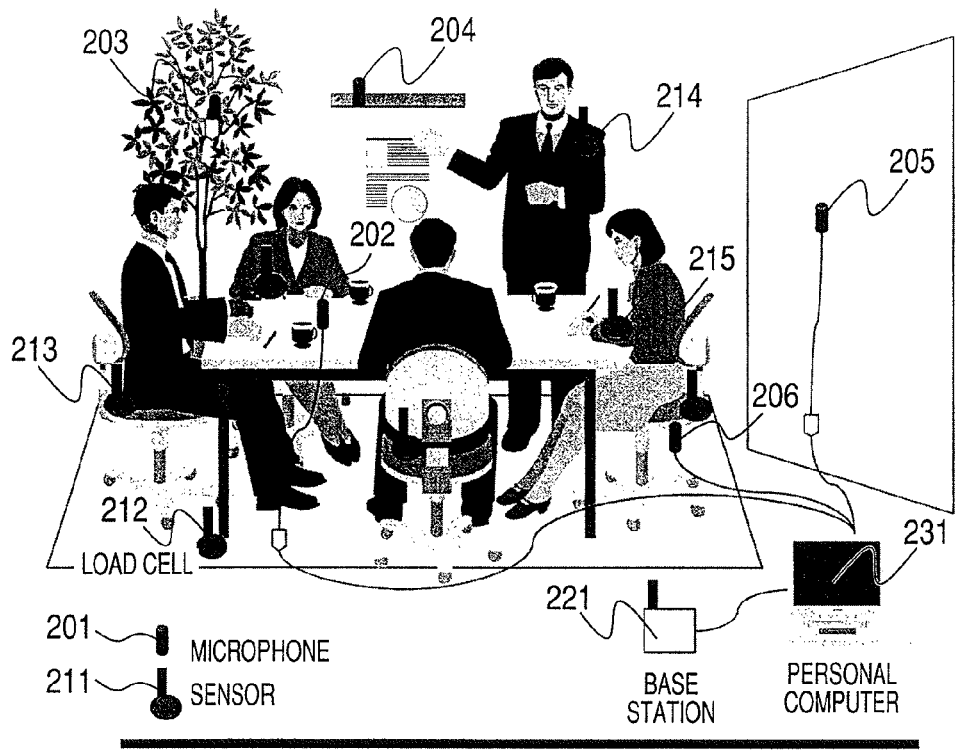
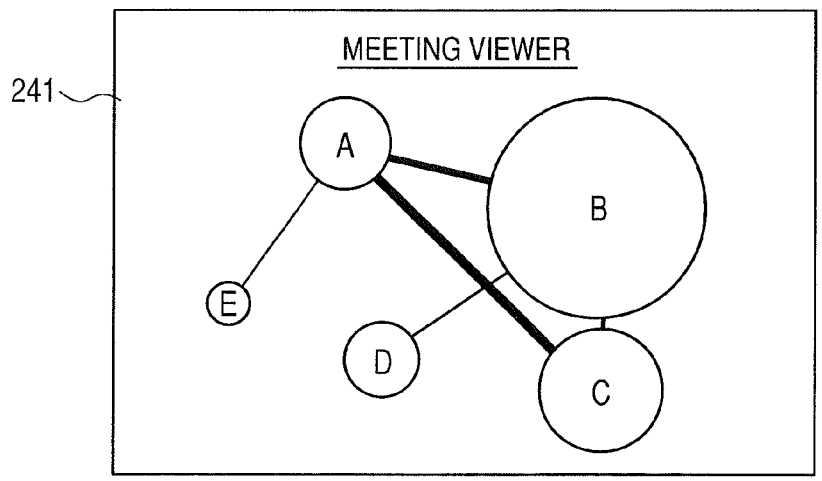

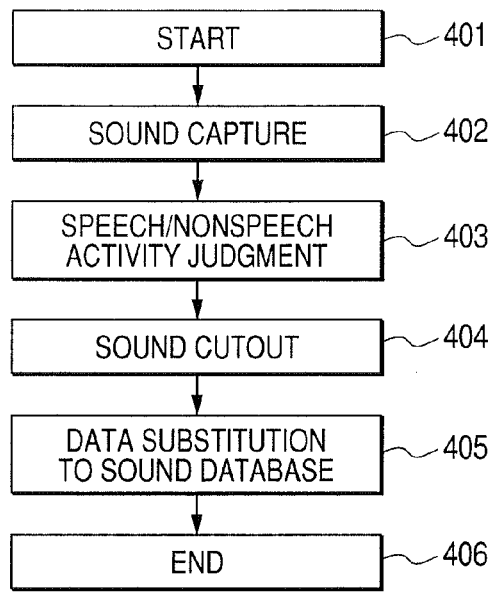
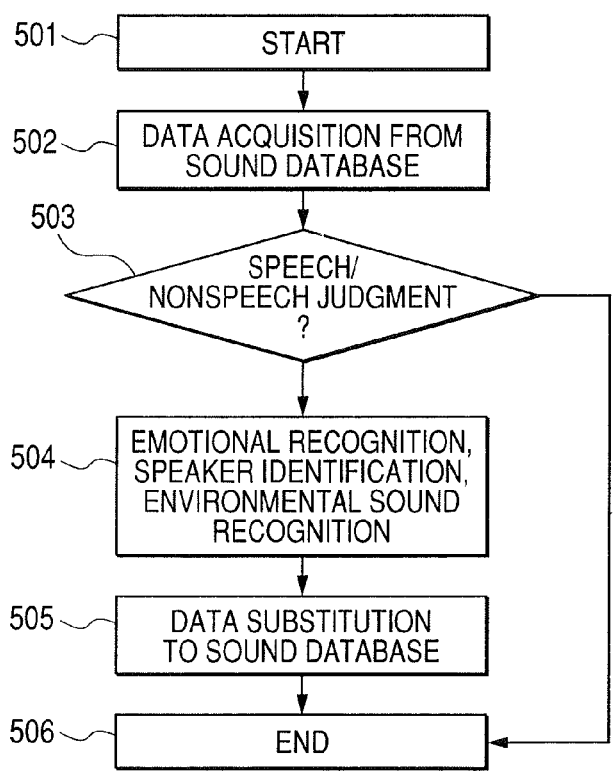

FIG. 10

| | ID | 1 | 2 | |
|---|---|---|---|---|
| 1001 | ID | 1 | 2 | |
| 1002 | STARTING TIME | 2005/07/14 12:30:04 | 2005/07/14 12:30:24 | |
| 1003 | CLOSING TIME | 2005/07/14 12:30:23 | 2005/07/14 12:30:40 | |
| 1004 | MICROPHONE ID | No.1 | No.2 | |
| 1005 | SPEECH/ NONSPEECH | SPEECH | NONSPEECH | |
| 1006 | SAVED FILE NAME | c:¥data¥sound1234. raw | c:¥data¥sound1235. raw | |
| 1007 | PERSON | TARO YAMADA | | |
| 1008 | EMOTION | | | |
| 1009 | ENVIRONMENTAL SOUND | | | |

(columns 1010, 1011)

FIG. 11

| | 1109 | 1110 | |
|---|---|---|---|
| ID | 1 | 2 | |
| STARTING TIME | 2005/07/14 12:30:04 | 2005/07/14 12:30:24 | |
| CLOSING TIME | 2005/07/14 12:30:23 | 2005/07/14 12:30:40 | |
| SAVED FILE NAME | c:¥data¥sensor1234.raw | c:¥data¥sensor1235.raw | |
| SENSOR ID No.1 — AVERAGE | 3.2 | 1.2 | |
| SENSOR ID No.1 — VARIANCE | 4.3 | 3.1 | |
| SENSOR ID No.1 — STANDARD DEVIATION | 0.2 | 0.8 | |
| SENSOR ID No.2 — AVERAGE | 1.2 | 6.4 | |
| SENSOR ID No.2 — VARIANCE | 0.8 | 0.2 | |
| SENSOR ID No.2 — STANDARD DEVIATION | 0.4 | 0.6 | |
| SENSOR ID No.3 — AVERAGE | 4.3 | 6.5 | |
| SENSOR ID No.3 — VARIANCE | 8.9 | 4.2 | |
| SENSOR ID No.3 — STANDARD DEVIATION | 0.2 | 0.3 | |

FIG. 12

| | 1 | 2 | 3 | |
|---|---|---|---|---|
| 1201 ID | 1 | | | |
| 1202 STARTING TIME | 2005/07/14 12:30:04 | | | |
| 1203 CLOSING TIME | 2005/07/14 12:30:23 | | | |
| 1204 SPEECH/NONSPEECH | SPEECH | | | |
| 1205 SENSOR ID No.1 PERSON | TARO YAMADA | | | |
| INTEREST LEVEL | 0.6 | | | |
| 1206 SENSOR ID No.2 PERSON | HANAKO YAMADA | | | |
| INTEREST LEVEL | 0.8 | | | |
| 1207 SENSOR ID No.3 PERSON | | | | |
| INTEREST LEVEL | | | | |
| SENSOR ID No.4 PERSON | JIRO YAMADA | | | |
| INTEREST LEVEL | 0.2 | | | |

| | 1 | 2 | 3 |
|---|---|---|---|
| ID | | | |
| STARTING TIME | 2005/07/14 12:30:04 | | |
| CLOSING TIME | 2005/07/14 12:30:23 | | |
| SPEECH/NONSPEECH | SPEECH | | |
| MICROPHONE ID No.1 — PERSON | TARO YAMADA | | |
| MICROPHONE ID No.1 — EMOTION | NEUTRAL | | |
| MICROPHONE ID No.1 — INTEREST LEVEL | 0.6 | | |
| MICROPHONE ID No.1 — ENVIRONMENTAL SOUND | | | |
| MICROPHONE ID No.2 — PERSON | | | |
| MICROPHONE ID No.2 — EMOTION | | | |
| MICROPHONE ID No.2 — INTEREST LEVEL | | | |
| MICROPHONE ID No.2 — ENVIRONMENTAL SOUND | | | |

FIG. 14

| ID | ITEM | CUSTOMIZED VALUE |
|---|---|---|
| MICROPHONE ID No.1 | INSTALLATION LOCATION | |
| | PERSON | TARO YAMADA |
| | THRESHOLD VALUE (ENERGY) | 3.2 |
| | THRESHOLD VALUE (ZERO CROSS) | 4.2 |
| MICROPHONE ID No.2 | INSTALLATION LOCATION | |
| | PERSON | HANAKO YAMADA |
| | THRESHOLD VALUE (ENERGY) | 1.2 |
| | THRESHOLD VALUE (ZERO CROSS) | 2.1 |
| SENSOR ID No.1 | INSTALLATION LOCATION | |
| | PERSON | TARO YAMADA |
| | COEFFICIENT (AVERAGE) | 0.6 |
| | COEFFICIENT (VARIANCE) | 1.0 |
| | COEFFICIENT (STANDARD DEVIATION) | 0.4 |
| SENSOR ID No.2 | INSTALLATION LOCATION | |
| | PERSON | HANAKO YAMADA |
| | COEFFICIENT (AVERAGE) | 0.4 |
| | COEFFICIENT (VARIANCE) | 0.6 |
| | COEFFICIENT (STANDARD DEVIATION) | 0.8 |

FIG. 15

| ITEM | | COEFFICIENT 1 | COEFFICIENT 2 | COEFFICIENT 3 | COEFFICIENT 4 | COEFFICIENT 5 |
|---|---|---|---|---|---|---|
| MALE | STANDARDIZED VALUE | | | | | |
| | CUSTOMIZED VALUE | | | | | |
| FEMALE | STANDARDIZED VALUE | | | | | |
| | CUSTOMIZED VALUE | | | | | |
| TARO YAMADA | STANDARDIZED VALUE | | | | | |
| | CUSTOMIZED VALUE | | | | | |
| HANAKO YAMADA | STANDARDIZED VALUE | | | | | |
| | CUSTOMIZED VALUE | | | | | |

FIG. 16

| | | | COEFFICIENT 1 | COEFFICIENT 2 | COEFFICIENT 3 | COEFFICIENT 4 |
|---|---|---|---|---|---|---|
| ITEM | | | | | | |
| MALE | ANGER | STANDARDIZED VALUE | | | | |
| | | CUSTOMIZED VALUE | | | | |
| | NEUTRAL | STANDARDIZED VALUE | | | | |
| | | CUSTOMIZED VALUE | | | | |
| | LAUGH | STANDARDIZED VALUE | | | | |
| | | CUSTOMIZED VALUE | | | | |
| | SADNESS | STANDARDIZED VALUE | | | | |
| | | CUSTOMIZED VALUE | | | | |
| FEMALE | ANGER | STANDARDIZED VALUE | | | | |
| | | CUSTOMIZED VALUE | | | | |
| | NEUTRAL | STANDARDIZED VALUE | | | | |
| | | CUSTOMIZED VALUE | | | | |
| | LAUGH | STANDARDIZED VALUE | | | | |
| | | CUSTOMIZED VALUE | | | | |
| | SADNESS | STANDARDIZED VALUE | | | | |
| | | CUSTOMIZED VALUE | | | | |
| TARO YAMADA | ANGER | STANDARDIZED VALUE | | | | |
| | | CUSTOMIZED VALUE | | | | |
| | NEUTRAL | STANDARDIZED VALUE | | | | |
| | | CUSTOMIZED VALUE | | | | |
| | LAUGH | STANDARDIZED VALUE | | | | |
| | | CUSTOMIZED VALUE | | | | |
| | SADNESS | STANDARDIZED VALUE | | | | |
| | | CUSTOMIZED VALUE | | | | |

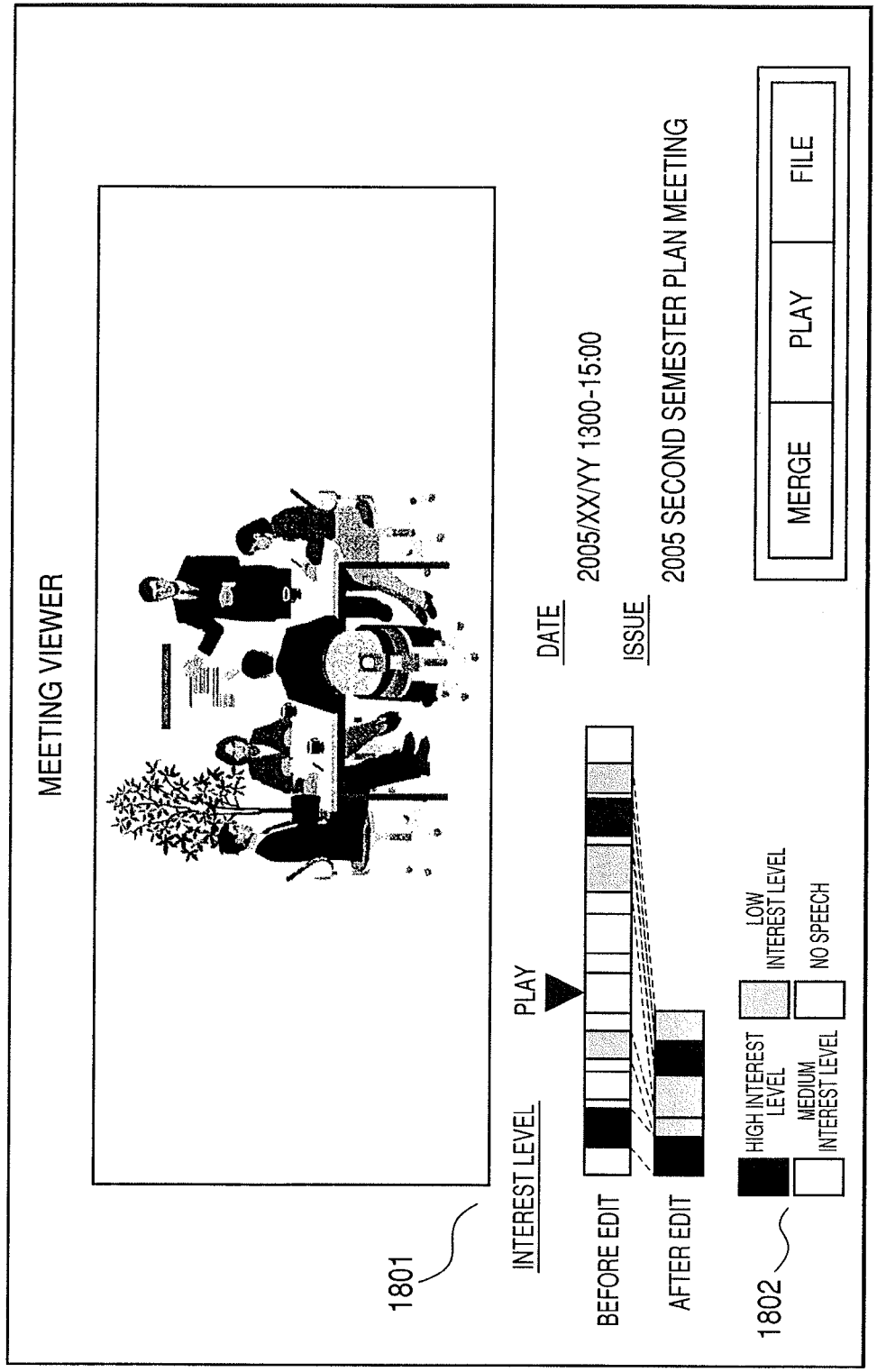

CONVERSATIONAL SPEECH ANALYSIS METHOD, AND CONVERSATIONAL SPEECH ANALYZER

CROSS REFERENCE TO RELATED APPLICATION

This application is a continuation application of application Ser. No. 11/705,756, filed Feb. 14, 2007 now U.S. Pat. No. 8,036,898, the disclosure of which is hereby incorporated by reference.

CLAIM OF PRIORITY

The present application claims priority from Japanese application JP 2006-035904 filed on Feb. 14, 2006, the content of which is hereby incorporated by reference into this application.

FIELD OF THE INVENTION

The present invention relates to the visualization of the state of a meeting which, at a place where a large number of people discuss an issue. The interest level that the participants have in the discussion is analyzed, the activity of the participants at the meeting can be evaluated and the progress of the meeting can be evaluated for those not present at the meeting. By saving this information, it can be used for future log analysis.

BACKGROUND OF THE INVENTION

It is desirable to have a technique to record the details of a meeting, and many such conference recording methods have been proposed. Most often, the minutes of the meeting are recorded as text. However, in this case, only the decisions are recorded, and it is difficult to capture the progress, emotion and vitality of the meeting which can only be appreciated by those present, such as the mood or the effect on other participants. To record the mood of the meeting, the utterances of the participants can be recorded, but playback requires the same amount of time as the meeting time, so this method is only partly used.

Another method has been reported wherein the relationships between the participants is displayed graphically. This is a technique which displays personal interrelationships by analyzing electronic information, such as E-mails and web access logs, (for example, JP-A NO. 108123/2001). However, the data used for displaying personal interrelationships is only text, and these interrelationships cannot be displayed graphically from the utterances of the participants.

SUMMARY OF THE INVENTION

A meeting is an opportunity for lively discussion, and all participants are expected to offer constructive opinions. However, if no lively discussion took place, there must have been some problems whose cause should be identified.

In a meeting, it is usual to record only the decisions that were made. It is therefore difficult to fully comprehend the actions and activity of the participants, such as the topics in which they were interested and by how much.

When we participate in a meeting, it is common for the participants to react to important statements by some action such as nodding the head or taking memos. To analyze the state of a meeting and a participant's activity, these actions must be detected by a sensor and analyzed.

The problem that has to be solved, therefore, is to appreciate how the participants behaved, together with their interest level and the mood and progress of the meeting by analyzing the information obtained from microphones and sensors, and by graphically displaying this obtained information.

The essential features of the invention disclosed in the application for the purpose of resolving the above problem, are as follows. The conversational speech analysis method of the invention includes a sound capture means for capturing sound from a microphone, a speech/nonspeech activity detection means for cutting out speech frames and nonspeech frames from the captured sound, a frame-based speech analysis means which performs analysis for each speech/nonspeech frame, a sensor signal capture means for capturing a signal from a sensor, a sensor activity detection means for cutting out the captured signal for each frame, a frame-based sensor analysis means for calculating features from a signal for each frame, an interest level judging means for calculating an interest level from the speech and sensor information for each frame, and an output means for displaying a graph from the interest level.

In this conversational speech analysis method, the state of a meeting and its participants can be visualized from the activity of the participants, and the progress, mood and vitality of the meeting, by analyzing the data captured from the microphone and the sensor, and displaying this information graphically.

By acquiring information such as the progress, mood and vitality of the meeting, and displaying this information graphically, the meeting organizer can extract useful elements therefrom. Moreover, not only the meeting organizer, but also the participants can obtain information as to how much they participated in the meeting.

The present invention assesses the level of involvement of the participants in a meeting and useful utterances in which a large number of participants are interested. The present invention may therefore be used to prepare minutes of the meeting, or evaluate speakers who made useful comments by selecting only useful utterances. Furthermore, it can be used for project management, which is a tool for managing a large number of people.

BRIEF DESCRIPTION OF THE DRAWINGS

FIG. 2 is an image of the conversational speech analysis according to the invention;

FIG. 4 is a speech/nonspeech activity detection processing and corresponding flow chart;

FIG. 5 is a frame-based sound processing and corresponding flow chart;

FIG. 10 is a speech database for storing frame-based sound information;

FIG. 11 is a database for storing frame-based sensor information;

FIG. 12 is an interest level database (sensor) for storing sensor-based interest levels;

FIG. 13 is an interest-level database (microphone) for storing microphone-based interest levels;

FIG. 14 is a customized value database for storing personal characteristics;

FIG. 15 is a database used for speaker recognition;

FIG. 16 is a database used for emotion recognition;

FIG. 18 is a time-based visualization of useful utterances in the meeting.

DETAILED DESCRIPTION OF THE PREFERRED EMBODIMENTS

Figure 1:
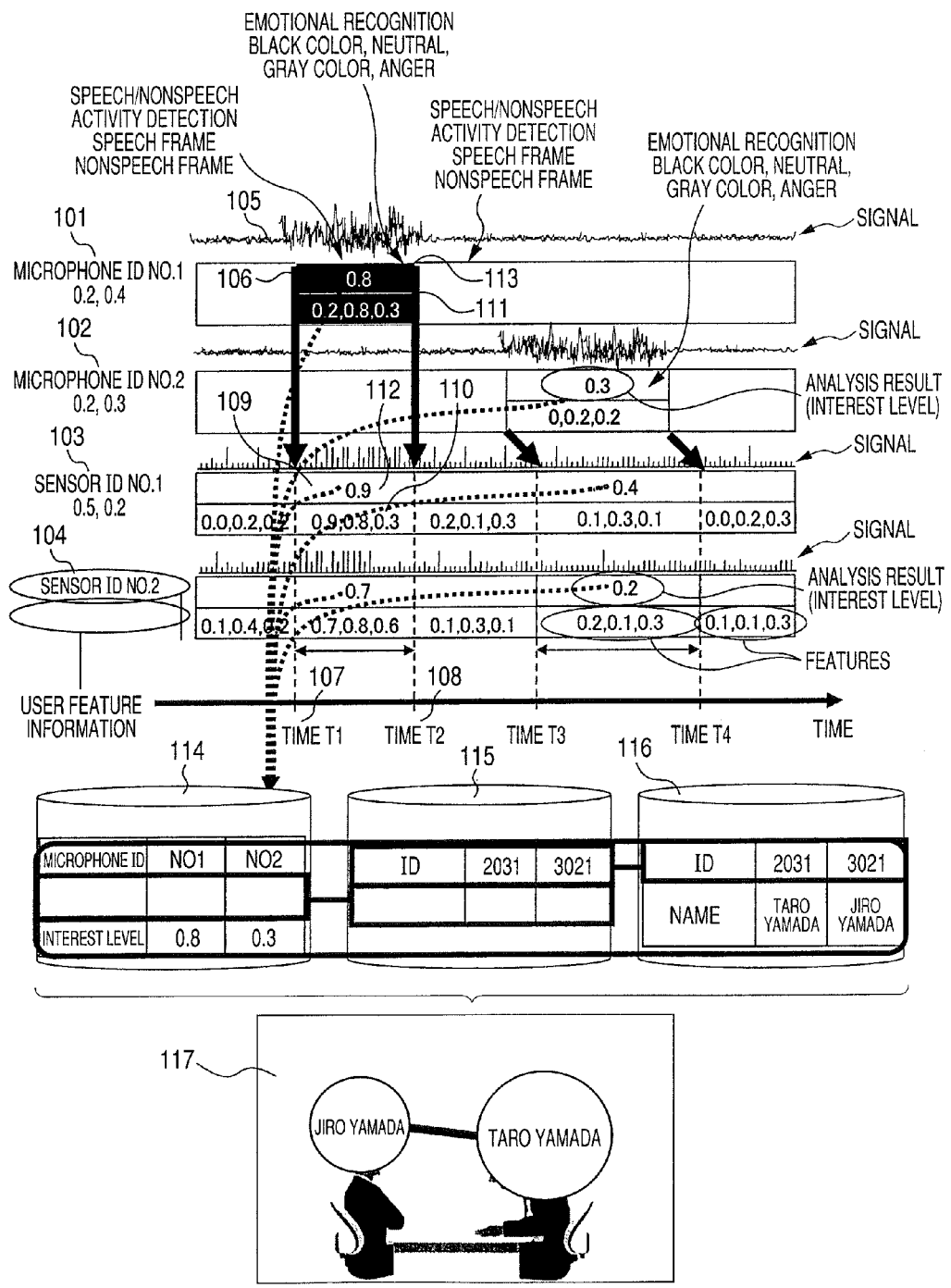
FIG. 1 is a schematic view of a conversational speech analysis according to the invention.

Some preferred embodiments of the invention will now be described referring to the drawings.

FIG. 1 is a schematic diagram of the invention for implementing a conversational voice analysis method. One example of the analytical procedure will now be described referring to FIG. 1. In order to make for easier handling of data, ID (101-104) are assigned to microphones and sensors. First, to calculate a speech utterance frame, speech/nonspeech activity detection is performed on sound 105 captured by the microphone. As a result, a speech frame 106 is detected. Next, since a speech frame cannot be found from a sensor signal, activity detection of the sensor signal is performed using a time T1 (107) which is the beginning and a time T2 (108) which is the end of the speech frame 106. Feature extraction is performed respectively on the sensor signal in a frame 109 and sound in the speech frame 106 found by this processing, and features are calculated. The feature of the frame 109 is 110, and the feature of the speech frame 106 is 111. This processing is performed on all the frames. Next, an interest level is calculated from the calculated features. The interest level of the frame 109 is 112, and the interest level of the speech frame 106 is 113. The calculated interest level is stored in an interest level database 114 in order to save the interest level. Next, an analysis is performed using the information stored in the database, and a visualization is made of the result. Plural databases are used, i.e., an interest level database 114 which stores the interest level, a location database 115 which stores user location information, and a name database 116 which stores the names of participants. If the data required for visualization are a person's name and interest level, an analysis can be performed by using these three databases. The visualization result is shown on a screen 117. On the screen 117, to determine the names of persons present and their interest level, ID are acquired from the location of the interest level database 114 and location database 115, and names are acquired from the ID of the location database 115 and ID of the name database 116.

Figure 3:
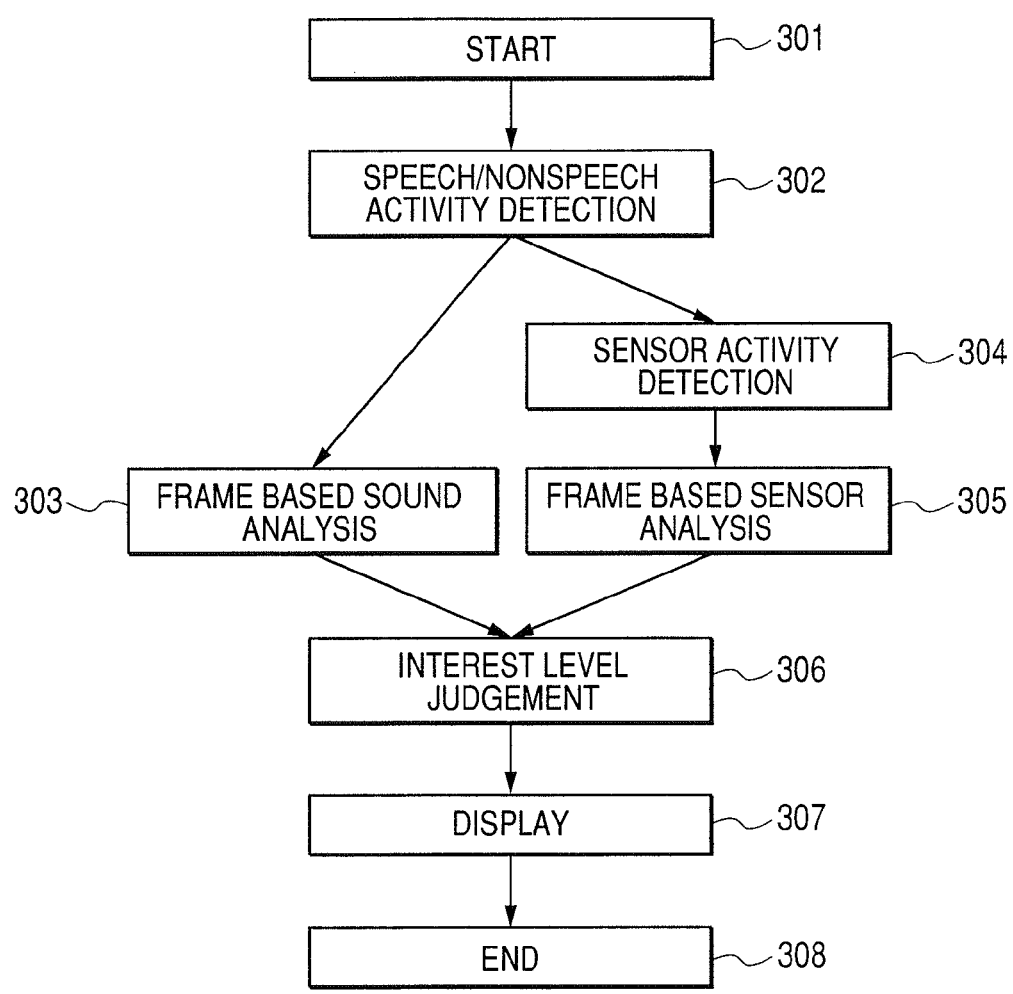
FIG. 3 is a flow chart of the conversational speech analysis used in the invention.
Figure 6:
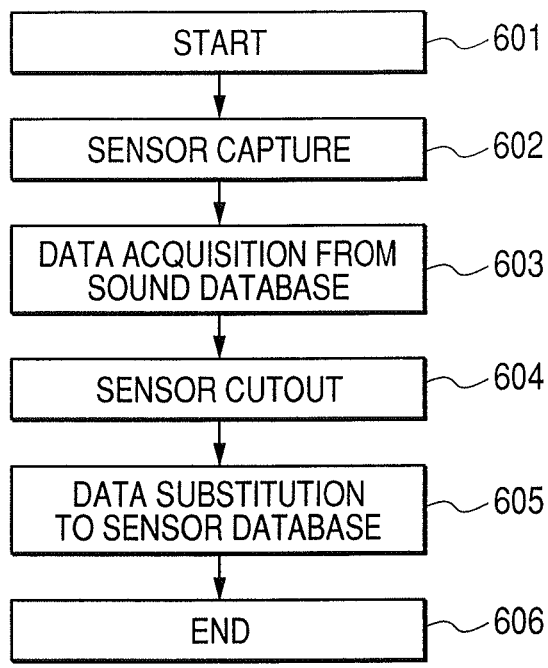
FIG. 6 is a sensor activity detection processing and corresponding flow chart.
Figure 7:
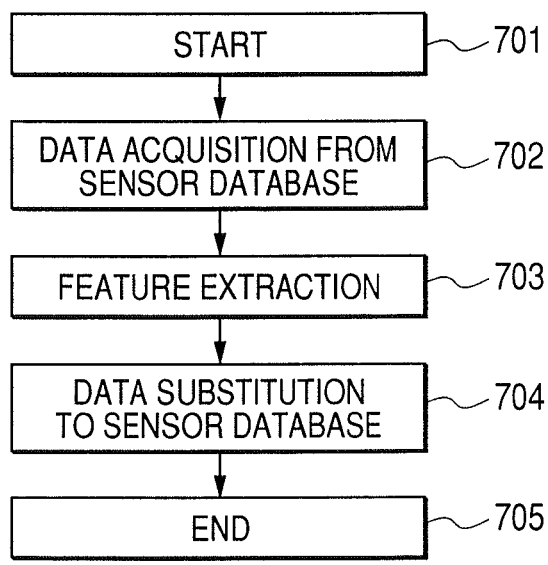
FIG. 7 is a frame-based sensor analysis process and corresponding flow chart.
Figure 8:
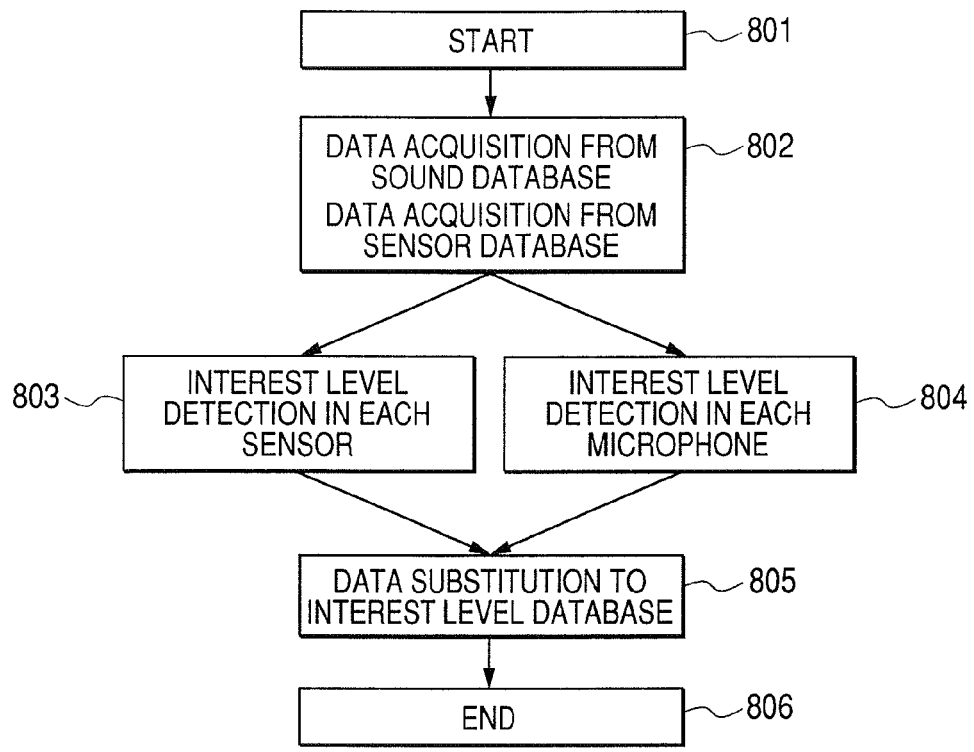
FIG. 8 is an interest level judgment process and corresponding flow chart.
Figure 9:
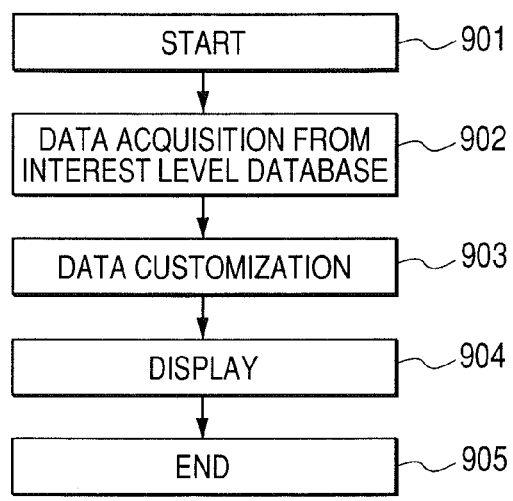
FIG. 9 is a display process and corresponding flow chart.
Figure 17:
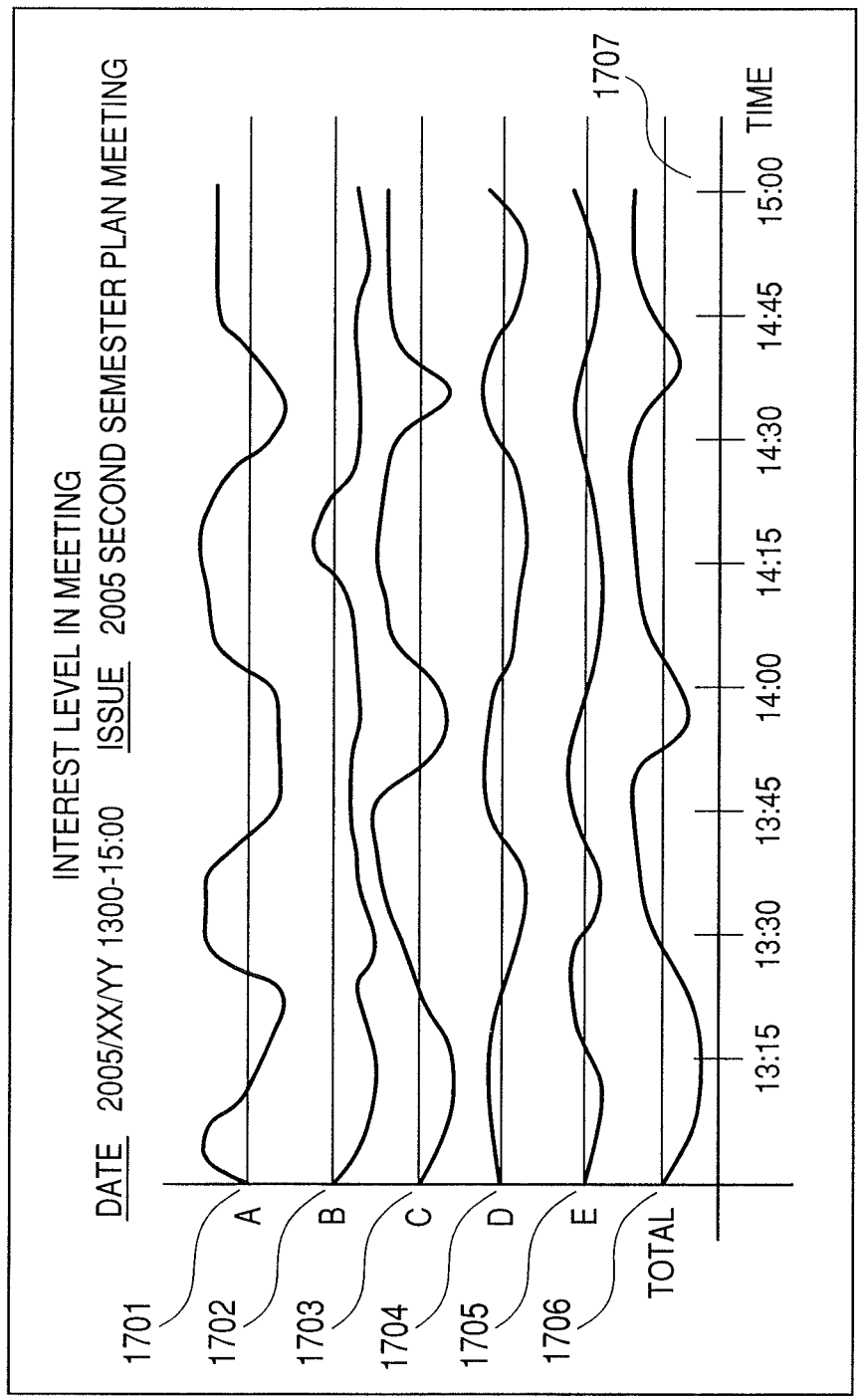
FIG. 17 is a time-based visualization of utterances by persons in the meeting.

Next, the diagrams used to describe the present invention will be described. FIG. 1 is a schematic diagram of conversational speech analysis. FIG. 2 is a user image of conversational speech analysis. FIG. 3 is a flow chart of conversational speech analysis. FIG. 4 is a flow chart of speech/nonspeech activity detection. FIG. 5 is a flow chart of a frame-based speech analysis. FIG. 6 is a flow chart of sensor activity detection. FIG. 7 is a flow chart of sensor analysis according to frame. FIG. 8 is a flow chart of interest level determination. FIG. 9 is a flow chart of a display. FIG. 10 is a speech database. FIG. 11 is a sensor database. FIG. 12 is an interest level database (sensor). FIG. 13 is an interest level database (microphone). FIG. 14 is a customized value database. FIG. 15 is a speaker recognition database. FIG. 16 is an emotion recognition database. FIG. 17 is a visualization of the interest level of persons according to time in the meeting. FIG. 18 is a visualization of useful utterances according to time in the meeting.

According to the present invention, the interest level of participants in a certain topic is found by analysis using microphone and sensor signals. As a result of this analysis, the progress, mood and vitality of the meeting become useful information for the meeting organizer. This useful information is used as support to improve project administration.

An embodiment using the scheme shown in FIG. 1 will now be described using FIG. 2. FIG. 2 is an application image implemented by this embodiment. FIG. 2 is a scene where a meeting takes place, many sensors and microphones being deployed in the vicinity of a desk and the participants. A microphone 201 and sensor 211 are used to measure the state of participants in real time. Further, this microphone 201 and sensor 211 are preferably deployed at locations where the participants are not aware of them.

The microphone 201 is used to capture sound, and the captured sound is stored in a personal computer 231. The personal computer 231 has a storage unit for storing the captured sound and sensor signals, various databases and software for processing this data, as well as a processing unit which performs processing, and a display unit which displays processing analysis results. The microphone 201 is installed at the center of a conference table like the microphone 202 in order to record a large amount of speech. Apart from locating the microphone in a place where it is directly visible, it may be located in a decorative plant like the microphone 203, on a whiteboard used by the speaker like the microphone 204, on a conference room wall like the microphone 205, or in a chair where a person is sitting like the microphone 206.

The sensor 211 is used to grasp of the movement of a person, signals from the sensor 211 being sent to a base station 221 by radio. The base station 221 receives the signal which has been sent from the 211, and the received signal is stored by the personal computer 231. The sensor 211 may be of various types, e.g. a load cell may be installed which detects the movement of a person by the pressure force on the floor like the sensor 212, a chair weight sensor may be installed which detects a bodyweight fluctuation like the sensor 213, an acceleration sensor may be installed on clothes, spectacles or a name card which detects the movement of a person like the sensor 214, or a an acceleration sensor may be installed on a bracelet, ring or pen to detect the movement of the hand or arm like the sensor 215.

A chart which displays the results of analyzing the signals obtained from the microphone 201 and sensor 211 by the personal computer 231 on the screen of the personal computer 231, is shown by a conference viewer 241.

The conference viewer 241 displays the current state of the meeting, and a person who was not present at the meeting can grasp the mood of the meeting by looking at this screen. Further, the conference viewer 241 may be stored to be used for log analysis.

The conference viewer 241 is a diagram comprised of circles and lines, and shows the state of the meeting. The conference viewer 241 shows whether the participants at the meeting uttered any useful statements. The alphabetical characters A-E denote persons, circles around them denote a useful utterance amount, and the lines joining the circles denote the person who spoke next. The larger the circle, the larger the useful utterance amount is, and the thicker the line, the more conversation occurred between the two persons it joins. Hence, by composing this screen, it is possible to grasp the state of the conference at a glance.

A procedure to analyze conversational speech will now be described referring to the flow chart of FIG. 3. In this analysis, it is determined to what extent the participants were interested in the present meeting by using the speech from the microphone 201 and the signal from the sensor 211. Since it is possible to analyze the extent to which participants were interested in the topics raised at the meeting, it is possible to detect those utterances which were important for the meeting. Also, the contribution level of the participants at the meeting can be found from this information.

In this patent, an analysis is performed by finding a correlation between signals in speech and nonspeech frames. In the analytical method, first, a frame analysis is performed on the speech recorded by the microphone, and the frames are divided into speech frames and nonspeech frames. Next, this classification is applied to the sensor signal recorded from the sensor, and a distinction is made between speech and nonspeech signals. A correlation between speech and nonspeech signals which is required to visualize the state of the persons present, is thus found.

Next, the conversational speech analysis procedure will be described referring to the flow chart of FIG. 3. A start 301 is the start of the conversational speech analysis. A speech/nonspeech activity detection 302 is processing performed by the personal computer 231 which makes a distinction between speech and nonspeech captured by the microphone 201, and detects these frames. FIG. 4 shows the detailed processing.

A frame-based analysis 303 is processing performed by the personal computer 231 which performs analysis on the speech and nonspeech cut out by the speech/nonspeech activity detection 302. FIG. 5 shows the detailed processing.

A sensor activity detection 304 is processing performed by the personal computer 231 which distinguishes sensor signals according to frame using the frame information of the speech/nonspeech activity detection 302. FIG. 6 shows the detailed processing.

A frame-based sensor analysis 305 is processing performed by the personal computer 231 which performs analysis on signals cut out by the sensor activity detection 304. FIG. 7 shows the detailed processing.

An interest level determination 306 is processing performed by the personal computer 231, which determines how much interest (i.e. the interest level) the participants have in the conference, by using frame-based information analyzed by the frame-based speech analysis 303 and frame-based sensor analysis 305. FIG. 8 shows the detailed processing.

A display 307 is processing performed by the personal computer 231 which processes the results of the interest level determination 306 into information easily understood by the user, and one of the results thereof is shown graphically on the screen 241. FIG. 9 shows the detailed processing. An end 308 is the end of the conversational speech analysis.

The processing of the speech and/or nonspeech activity detection 302 will now be described referring to the flow chart of FIG. 4. This processing, which is performed by the personal computer 231, makes a classification into speech and nonspeech using the sound recorded by the microphone 201, finds frames classified as speech or nonspeech, and stores them in the speech database (FIG. 10). A start 401 is the start of speech/nonspeech activity detection.

A speech capture 402 is processing performed by the personal computer 231 which captures sound from the microphones 201. Also, assuming some information is specific to the microphone, it is desirable to store not only speech but also information about the microphone ID number, preferably in a customized value database (FIG. 14) which manages data.

A speech/nonspeech activity detection 403 is processing performed by the personal computer 231 which classifies the sound captured by the speech capture 402 into speech and nonspeech. This classification is performed by dividing the speech into short time intervals of about 10 ms, calculating the energy and zero cross number in this short time interval, and using these for the determination. This short time interval which is cut out is referred to as an analysis frame. The energy is the sum of the squares of the values in the analysis frame. The number of zero crosses is the number of times the origin is crossed in the analysis frame. Finally, a threshold value is preset to distinguish between speech and nonspeech, values exceeding the threshold value being taken as speech, and values less than the threshold value being taken as nonspeech.

Now, if a specific person recorded by the microphone is identified, a performance improvement may be expected by using a threshold value suitable for that person. Specifically, it is preferable to use an energy 1405 and zero cross 1406, which are threshold values for the microphone ID in the customized value database (FIG. 14), as threshold values. For the same reason in the case of, emotion recognition and speaker recognition, if there are coefficients suitable for that person, it is preferable to store a customized value 1504 in the speaker recognition database of FIG. 15 for speaker recognition, and a customized value 1604 in the emotion recognition database of FIG. 16 for emotion recognition. This method is one example of the processing performed to distinguish speech and nonspeech in sound, but any other common procedure may also be used.

A speech cutout 404 is processing performed by the personal computer 231 to cut out speech from each utterance of one speaker. A speech/nonspeech activity detection 403 performs speech/nonspeech detection, and this detection is performed in a short time interval of about 10 ms. Hence, it is analyzed whether the judgment result of a short time interval is continually the same, and the result is continually judged to be speech, this frame is regarded as an utterance.

To enhance the precision of the utterance frame, a judgment may be made also according to the length of the detected frame. This is because one utterance normally lasts several seconds or more, and frames less than this length are usually sounds which are not speech, such as noise.

This technique is an example of processing to distinguish speech from nonspeech, but any other generally known method may be used. Further, when a frame is detected, it is preferable to calculate the start time and the ending time of the frame. After cutting out both the speech frames and nonspeech frames based on the result of this activity detection, they are stored in the memory of the personal computer 231.

A speech database substitution 405 is processing performed by the personal computer 231 to output frames detected by the speech cutout 404 to the speech database (FIG. 10).

The recorded information is a frame starting time 1002 and closing time 1003, a captured microphone ID 1004, a result 1005 of the speech/nonspeech analysis, and a filename 1006 of the speech captured by the speech cutout 404. The frame starting time 1002 and closing time 1003 are the cutout time and date. Since plural microphones are connected, the captured microphone ID 1004 is a number for identifying them. The result 1005 of the speech/nonspeech analysis is the result identified by the speech cut out 404, and the stored values are speech or nonspeech.

When the filename of the speech cut out by the speech cutout 404 is decided, and speech is cut out from the result of the activity detection by the speech cutout 404 and stored in the memory, the data is converted to a file and stored. The filename 1006 which is stored is preferably uniquely identified by the detected time so that it can be searched easily later, and is stored in the speech database. An end 406 is the end of speech/nonspeech activity detection.

The procedure of the frame-based sound analysis 303 will now be described referring to the flow chart of FIG. 5. This processing is performed by the personal computer 231, and analyzes the sound contained in this frame using the speech/nonspeech frames output by the speech/nonspeech activity detection 302. A start 501 is the start of the frame-based sound analysis.

A sound database acquisition 502 is performed by the personal computer 231, and acquires data from the speech database (FIG. 10) to obtain sound frame information.

A speech/nonspeech judgment 503 is performed by the personal computer 231, and judges whether the frame in which the sound database acquisition 502 was performed is speech or nonspeech. This is because the items to be analyzed are different for speech and nonspeech. By looking up the speech/nonspeech 1005 from the speech database (FIG. 10), an emotion recognition/speaker recognition/environmental sound recognition 504 is selected in the case of speech, and an end 506 is selected in the case of nonspeech.

The emotion recognition/speaker recognition 504 is performed by the personal computer 231 for items which are judged to be speech in the speech/nonspeech determination 503. Emotion recognition and speaker recognition are performed for the cutout frames.

Firstly, as the analysis method, the sound of this frame is cut into short time intervals of about 10 ms, and features are calculated for this short time interval. In order to calculate the height (fundamental frequency) of the sound which is one feature. 1: The power spectrum is calculated from a Fourier transform. 2: An auto correlation function is executed for this power spectrum. 3: The peak of the autocorrelation function is calculated. And, 4: The period of the peak is found, and the reciprocal of this period is calculated. In this way, the height (fundamental frequency) of the sound can be found from the sound. The fundamental frequency can be found not only by this method, but also by any other commonly known method. The feature is not limited to the height of the sound, and may additionally be a feature such as the interval between sounds, long sounds, laughter, sound volume and sound rate, from which a feature for detecting the mood is detected, and taken as a feature for specifying the mood. These are one example, and they may be taken as a feature from the result of analyzing the speech. Also, the variation of the feature over time may also be taken as a feature. Further, any other commonly known mood feature may also be used as the feature.

Next, emotion recognition is performed using this feature. Firstly, for emotion recognition, learning is first performed using identification analysis, and an identification parameter coefficient is calculated from the feature of the previously disclosed speech data. These coefficients are different for each emotion to be detected, and are the coefficients 1-5 (1610-1613) in the emotion recognition database (FIG. 16). As a result, for the 5 feature amounts $X_1, X_2 \ldots X_5$, the formula for the distinction coefficient is $Z = a_1 X_1 + a_2 X_2 + \ldots + a_5 X_5$ from the 5 coefficients $a_1, a_2 \ldots a_5$ used for learning. This formula is calculated for each emotion, and the smallest value is taken as the emotion. This technique is one example for specifying an emotion, but another commonly known technique may also be used, for example a technique such as neural networks or multivariate analysis.

Speaker recognition may use a process that is identical to emotion recognition. For the coefficient of the identifying function, a speaker recognition database (FIG. 15) is used. This technique is one example for identifying a speaker, but another commonly known technique may be used.

If a speaker could not be identified by emotion recognition, the speech may actually be another sound. It is preferable to know what this other sound is, one example being environmental noise. For this judgment, environmental noises such as a buzzer, or music and the like, are identified for the cutout frame. The identification technique may be identical to that used for the emotion recognition/speaker recognition 504. This technique is one example of identifying environmental noise in the vicinity, but another commonly known technique may be used.

A speech database acquisition 505 is performed by the personal computer 231, and outputs the result of the emotion recognition/speaker recognition/peripheral noise recognition 504 to the speech database (FIG. 10). The information recorded is a person 1007 and an emotion 1008 in the case of speech, and an environmental noise 1009 in the case of nonspeech, for the corresponding frame. An end 506 is the end of speech/nonspeech activity detection.

The procedure of the sensor activity detection 303 will now be described referring to the flow chart of FIG. 6. This processing is performed by the personal computer 231, and is the cutting out of a sensing signal from the sensor 211 in the same frame using the speech/nonspeech frame information output by the speech/nonspeech activity detection 302. By performing this processing, the sensing state of a person in the speech frame and nonspeech frame can be examined. A start 601 is the start of sensor activity detection.

A sensor capture 602 is performed by the personal computer 231 which captures a signal measured by a sensor, and captures the signal from the sensor 211. Also, assuming that this information is not only a signal, but also contains sensor-specific information, it is desirable to save it as an ID-specific number, and preferable to store it in a customized value database (FIG. 14) which manages data.

A sensor database acquisition 603 is performed by the personal computer 231, and acquires data from the speech database to obtain speech/nonspeech frames (FIG. 10).

A sensor cutout 604 is performed by the personal computer 231, and selects the starting time 1002 and closing time 1003 from data read by the speech database read 603 to cut out a frame from the sensor signal. The sensor frame is then calculated using the starting time 1002 and the closing time 1003. Finally, sensor signal cutout is performed based on the result of activity detection, and saved in the memory of the personal computer 231.

A sensor database substitution 605 is performed by the personal computer 231, and outputs the frame detected by the sensor cutout 604 to the sensor database (FIG. 11). The data to be recorded are the frame starting time 1102 and closing time 1103, and the sensor filename 1104 cut out by the sensor activity detection 504. The frame starting time 1102 and closing time 1103 are the time and date of the cutoff. When the filename of the speech cut out by the sensor cutout 604 is decided, a sensor signal cutout is performed from the result of the activity detection by the sensor cutout 604 and stored in the memory, and this is converted to a file for storing.

If data other than a sensor signal is saved by the sensor cutout 604, it is desirable to save it in the same way as a sensor signal. The filename 1104 which is stored is preferably unique for easy search later. The determined filename is then stored in the speech database. An end 606 is the end of speech/sensor activity detection.

The processing of the frame-based sensor analysis 305 will now be described referring to the flow chart of FIG. 7. This processing, which is performed by the personal computer 231, analyzes the signal cut out by the sensor activity detection 304. By performing this processing, the signal sensed from a person in the speech and nonspeech frames can be analyzed. A start 701 is the start of the frame-based sensor analysis.

A sensor database acquisition 702 is performed by the personal computer 231, and acquires data from the sensor database to obtain frame-based sensor information (FIG. 11).

A feature extraction 703 is performed by the personal computer 231, and extracts the frame features from the frame-based sensor information. The features are the average, variance and standard deviation of the signal in the frame for each sensor. This procedure is an example of feature extraction, but another generally known procedure may also be used.

A sensor database substitution 704 is performed by the personal computer 231, and outputs the features extracted by the feature extraction 703 to the sensor database (FIG. 11). The information stored in the sensor database (FIG. 11) is an average 1106, variance 1107 and standard deviation 1108 of the corresponding frame. An end 705 is the end of the frame-based sensor analysis.

The processing of the interest level judgment 306 will now be described referring to the flow chart of FIG. 8. This processing, which is performed by the personal computer 231, determines the interest level from the features for each frame analyzed by the frame-based sound analysis 303 and frame-based sensor analysis 305. By performing this processing, a signal sensed from the person in the speech and nonspeech frames can be analyzed, and the difference between the frames can be found.

In this processing, an interest level is calculated from the feature correlation in speech and nonspeech frames. An interest level for each sensor and an interest level for each microphone, are also calculated. The reason for dividing the interest levels into two, is in order to find which one of the participants is interested in the meeting from the sensor-based interest level, and to find which utterance was most interesting to the participants from the microphone-based interest level. A start 801 is the start of interest level judgment.

A sound database acquisition/sensor database acquisition 802 is performed by the personal computer 231, and acquires data from the sound database (FIG. 10) and sensor database (FIG. 11) to obtain frame-based sound information and sensor information.

A sensor-based interest level extraction 803 is performed by the personal computer 231, and judges the interest level for each sensor in the frame. A feature difference is found between speech and nonspeech frames for persons near the sensor, it being assumed that they have more interest in the meeting the larger this difference is. This is because some action is performed when there is an important utterance, and the difference due to the action is large.

An interest level is calculated for a frame judged to be speech. The information used for the analysis is the information in this frame, and the information in the immediately preceding and immediately following frames.

First, the recording is divided into speech and nonspeech for each sensor, and normalization is performed.

The calculation formulae are features of normalized speech frames=speech frame features/(speech frame features+nonspeech frame features), and features of normalized nonspeech frames=nonspeech frame features/(speech frame features+nonspeech frame features). The reason for performing normalization is in order to lessen than the effect of scattering between sensors by making the maximum value of the difference equal to 1.

For example, in the case where sensor ID NO. 1 (1105) is used, the feature (average) in a normalized speech frame is $3.2/(3.2+1.2)=0.73$, the feature (average) in a normalized nonspeech frame is $1.2/(3.2+1.2)=0.27$, the feature (variance) in a normalized speech frame is $4.3/(4.3+3.1)=0.58$, the feature (variance) in a normalized nonspeech frame is $3.1/(4.3+3.1)=0.42$, the feature (standard deviation) in a normalized speech frame is $0.2/(0.2+0.8)=0.2$, and the feature (standard deviation) in a normalized nonspeech frame is $0.9/(0.2+0.8)=0.8$.

Next, the interest level is calculated. The calculation formula is shown by Formula 1. A sensor coefficient is introduced to calculate a customized interest level for a given person if the person detected by the sensor can be identified. The range of values for the interest level is 0-1. The closer the calculated value is to 1, the higher the interest level is. An interest level can be calculated for each sensor, and any other procedure may be used.

Sensor-based interest level=1/sensor average coefficient+sensor variance coefficient+sensor standard deviation coefficient×(sensor average coefficient×(normalized speech frame feature(average)−normalized nonspeech frame feature(average))$^2$+sensor variance coefficient×(normalized speech frame feature(variance)−normalized nonspeech frame feature(variance))$^2$+sensor average coefficient×(normalized speech frame feature (standard distribution)−normalized nonspeech frame feature(standard distribution))$^2$)   Formula 1:

The sensor coefficient is normally 1, but if the person detected by the sensor can be identified, performance can be enhanced by using a suitable coefficient for the person from the correlation with that person. Specifically, it is preferable to use a coefficient (average) 1410, coefficient (variance) 1411 and coefficient (standard deviation) 1412 which are corresponding sensor ID coefficients in the customized value database (FIG. 14). For example, in the case where sensor ID NO. 1 (1105) is used, the interest level of sensor ID NO. 1 is given by Formula 2 using the coefficients for sensor ID NO. 1 (1407) in the customized value database (FIG. 14). This technique is one example of specifying the interest level from the sensor, but other techniques known in the art may also be used.

$0.6(0.73-0.27)^2+1.0(0.58-0.42)^2+0.4(0.2-0.8)^2/0.6+1.0+0.4$   Formula 2:

A microphone-based interest level extraction 804 is performed by the personal computer 231, and calculates the interest level for each microphone in the frame. A feature difference between the frames immediately preceding and immediately following the speech frame recorded by the microphone is calculated, and the interest level in an utterance is determined to be greater, the larger this difference is.

In the calculation, an average interest level is calculated for each sensor found in the sensor-based interest level extraction 803, this being the average for the corresponding microphone ID. The calculation formula is shown by Formula 3. This procedure is one example of identifying the interest level from the sensors, but other procedures commonly known in the art may also be used.

Microphone-based interest level=1/the number of sensors(interest level of sensor 1+interest level of sensor 2+interest level of sensor 3)   Formula 3:

An interest level database substitution 805 is processing performed by the personal computer 231, the information calculated by the sensor-based interest level extraction being stored in the interest level database (sensor) (FIG. 12), and the information calculated by the microphone-based interest level extraction being stored in the interest level database (microphone) (FIG. 13).

In the case of the interest level database (sensor) (FIG. 12), an interest level is stored for each sensor in the frame. Also, when personal information is included for each sensor by the sound database acquisition sensor database acquisition 802, this information is recorded as person information 1206.

In the case of the interest level database (microphone) (FIG. 13), an interest level is stored for the microphone detected in the frame. When speech/nonspeech, person, emotion and environmental sound information for each microphone are included in the sound database acquisition sensor database acquisition 802, this information is recorded as a speech/nonspeech 1304, person 1306, emotion 1307 and environmental sound information 1308. An end 806 is the end of interest level judgment.

The processing of the display 307 will now be described referring to the flowchart of FIG. 9. In this processing, a screen is generated by the personal computer 231 using the interest level outputted by the interest level analysis 306. By performing such processing, user-friendliness can be increased. In this processing, it is intended to create a more easily understandable diagram by combining persons and times with the interest level. A start 901 is the start of the display.

An interest level database acquisition 902 is performed by the personal computer 231, and acquires data from an interest level database (sensor, microphone) (FIG. 12, FIG. 13).

A data processing 903 is processing performed by the personal computer 231, and processes required information from data in the interest level database (sensor, microphone) (FIG. 12, FIG. 13). When processing is performed, by first determining a time range and specifying a person, it can be displayed at what times interest was shown, and in whose utterances interest was shown.

To perform processing by time, it is necessary to specify a starting time and a closing time. In the case of real time, several seconds after the present time are specified. To perform processing by person, it is necessary to specify a person. Further, if useful data can be captured not only from time and persons, but also from locations and team names, this may be used.

Processing is then performed to obtain the required information when the screen is displayed. For example, FIG. 17 shows the change of interest level at each time for the participants in a meeting held in a conference room. This can be calculated from the database (sensor) of FIG. 12.

For the calculation, A-E (1701-1705) consist of: 1. dividing the specified time into still shorter time intervals, 2. calculating the sum of interest levels for persons included in the sensor ID, and 3. dividing by the total number of occasions to perform normalization. By so doing, the interest level in a short time is calculated.

In the case of a total 1706, this is the sum of the interest level for each user. In FIG. 17, although it is necessary to determine the axis of a participant's interest level, in this patent, normalization is performed and the range is 0-1. Therefore, assume that 0.5 which is the median, is the value of the interest level axis. In this way, it can be shown how much interest the participants have in the meeting.

Further, FIG. 18, by displaying the interest level of the participants, shows the variation of interest level in a time series. This shows how many useful utterances were made during the meeting. In FIG. 18, by cutting out only those parts with a high interest level, it can be shown how many useful utterances were made. Further, it is also possible to playback only speech in parts with a high interest level. This can be calculated from the interest level database (microphone) of FIG. 13.

The calculation of an interest level 1801 consists of 1. Further classifying the specified time into short times, 2. Calculating the sum of interest levels included in the microphone ID in a short time, and 3. Dividing by the total number of occasions to perform normalization. By so doing, the variation of interest level in a meeting can be displayed, and it can be shown how long a meeting with useful utterances took place. The closer the value is to 1, the higher the interest level is. Further, in the color specification 1802, a darker color is selected, the closer to 1 the interest level is.

The meeting viewer 241 in the interest level analysis image of FIG. 2, shows which participants made useful utterances. Participants A-E are persons, the circles show utterances with a high interest level, and the lines joining circles show the person who spoke next. It is seen that the larger the circle, the more useful utterances there are, and the thicker the line, the larger the number of occasions when there were following utterances.

This calculation can be performed from the interest level database (microphone) of FIG. 13. In the calculation, the circles are the sum of interest levels included in the microphone. ID in a specified time, and the lines show the sequence of utterances by persons immediately before and after the utterance frame. In this way, it can be shown who captured most people's attention, and made useful utterances. An end 905 is the end of the display.

In the speech/nonspeech activity detection 302, speech/nonspeech analysis is performed from the sound, and the output data at that time is preferably managed as a database referred to as a speech database. FIG. 10 shows one example of a speech database.

The structure of the speech database of FIG. 10 is shown below. The ID (1001) is an ID denoting a unique number. This preferably refers to the same frames and same ID as the database (FIG. 11). The starting time 1002 is the starting time in a frame output from the speech/nonspeech activity detection 302. The closing time 1003 is the closing time in a frame output from the speech/nonspeech activity detection 302. The starting time 1002 and closing time 903 are stored together with the date and time. The microphone ID 1004 is the unique ID of the microphone used for sound recording. The speech/nonspeech 1005 stores the result determined in the speech/nonspeech activity detection 302. The saved file 1006 is the result of cutting out the sound based on the frame determined by the speech/nonspeech activity detection 302 and storing this as a file, and a filename is stored for the purpose of easy reference later. The person 1007 stores the result of the speaker recognition performed by the emotion recognition/speaker recognition 504. The emotion 1008 stores the result of the emotion recognition performed by the emotion recognition/speaker recognition 504. Also, the environmental noise 1009 stores the identification result of the environmental sound recognition 505.

In the sensor activity detection 304, when sensor signal activity detection is performed using frames detected by the speech/nonspeech activity detection 302, the output data is preferably managed as a database. FIG. 11 shows one example of a sensor database.

The structure of the sensor database of FIG. 11 is shown below. The ID (1101) is an ID which shows an unique number. It is preferable that this is the same frame and ID as the speech database (FIG. 10). The starting time 1102 is the starting time in a frame output from the sensor activity detection 304. The closing time 1103 is the closing time in a frame output from the sensor activity detection 304. The starting time 1102 and closing time 1103 are stored as the date and time. The saved file 1104 is the result of cutting out the signal based on the frame determined by the sensor activity detection 304, and storing this as a file, and a filename is stored for the purpose of easy reference later. The sensor ID (1105) is the unique ID of the sensor used for sensing. The average 1006 stores the average in the frames for which the feature extraction 703 was performed. The variance 1107 stores the variance in the frames for which the feature extraction 703 was performed. The standard deviation 1008 stores the standard deviation in the frames for which the feature extraction 703 was performed.

When calculating the interest level, it is preferable to manage an output database, which is referred to as an interest level database. The interest level database is preferably calculated for each microphone/sensor, and FIG. 12 shows an example of the interest level database for each sensor.

The structure of the interest level database for each sensor in FIG. 12 is shown below. An ID (1201) is an ID showing a unique number. In the case of the same frame, it is preferable that the ID (1201) is the same ID as an ID (1301) of the interest level database (FIG. 13), the ID (1001) of the speech database (FIG. 10), and the ID (1101) of the sensor database (FIG. 11). A starting time 1202 stores the starting time calculated by the sensor-based interest level extraction 803. A closing time 1203 stores the end time calculated by the sensor-based interest level extraction 803. A speech/nonspeech 1204 stores the analysis result calculated by the sensor-based interest level extraction 803. A sensor ID NO. 1 (1205) stores the analysis result of the sensor for which the sensor ID is NO. 1. Examples of this value are a person 1206 and interest level 1207, which store the person and interest level calculated by the sensor-based interest level extraction 803.

FIG. 13 shows one example of the interest level database for each microphone. The structure of the interest level database for each microphone in FIG. 13 is shown below. The ID (1301) is an ID which shows a unique number. For the same frame, it is preferable that the ID (1301) is the same ID as the ID (1201) of the interest level database (FIG. 12), the ID (1001) of the speech database (FIG. 10), and the ID (1101) of the sensor database (FIG. 11). A starting time 1302 stores the starting time calculated by the microphone-based interest level extraction 804. A closing time 1303 stores the closing time calculated by the microphone-based interest level extraction 804. A speech/nonspeech 1304 stores the analysis result calculated by the microphone-based interest level extraction 804. A microphone ID NO. 1 (1305) stores the analysis result of the sound for which the microphone ID is NO. 1. Examples of this value are a person 1306, emotion 1307, interest level 1308, an environmental sound 1309, and these store the person, emotion, interest level and environmental sound calculated by the microphone-based interest level extraction 804.

In the speech/nonspeech activity detection 302 or the interest level judgment 306, sound and sensor signal analyses are performed, and to increase the precision of these analyses, information pertinent to the analyzed person is preferably added. For this purpose, if the person using a microphone or sensor is known, a database containing information specific to this person is preferably used. The database which stores personal characteristics is referred to as a customized value database, and FIG. 14 shows an example of this database.

An ID (1401) stores the names of the microphone ID and sensor ID. In the case of the microphone ID, it may be for example microphone ID No.1 (1402), and in the case of the sensor ID, it may be for example sensor ID No. 1 (1407). For the microphone ID NO. 1 (1402), if the microphone is installed, an installation location 1403 is stored, if only one person uses it, a person 1404 is stored, and if threshold values for customizing the location and the person are used, values are stored in a threshold value (energy) 1405 and threshold value (zero cross) 1406. The situation is identical for the sensor ID NO. 1 (1407). If the sensor is installed, an installation location 1408 is stored, if only one person uses it, a person 1409 is stored, and if a coefficient is used for customizing the location and person, values are stored in a coefficient (average) 1410, coefficient (variance) 1411, and a coefficient (standard deviation) 1412.

The frame-based analysis 303 is processing to analyze a sound cut out by the speech/nonspeech activity detection 302. In particular, to grasp the state of a person from speech, a database containing coefficients and feature amounts representing the state is required, and this is preferably managed. A database containing coefficients and features for speaker recognition is referred to as a speaker recognition database, and a database containing coefficients and features for emotion recognition is referred to as an emotion recognition database. FIG. 15 shows an example of a speaker recognition database, and FIG. 16 shows an example of an emotion recognition database.

First, one example (FIG. 15) of a speaker recognition database will be described. An item 1501 is an identifying item, and this item identifies male/female (male 1502, female 1505), or identifies a person (Taro Yamada 1506, Hanako Yamada 1507). The information is not limited to this, and may also include for example age or the like when it is desired to identify this. The values contained in the item may be classified into standard values 1503 and customized values 1504. The standard values 1503 are general values and are recorded beforehand by the personal computer 231. The customized values 1504 are values adapted to the individual, are transmitted together with the sensor signal from the sensor 211, and are stored in the speaker recognition database (FIG. 15). Further, each item consists of several coefficients, and in the case of the speaker recognition database (FIG. 15), these are denoted by the coefficients 1-5 (1508-1502).

Next, FIG. 16 will be described. An item 1601 is an identifying item, and this item identifies male/female (male 1602, female 1608), or identifies a person (Taro Yamada 1609). The item 1601 may show a person's emotion, and it may show emotion according to age as in the case of the item 1501 of FIG. 15. The values contained in this item may be for example emotions (anger 1602, neutrality 1605, laughter 1606, sadness 1607). The values are not limited to these, and other emotions may also be used when it is desired to identify them. The values may be classified into standard values 1603 and customized values 1604. The customized values 1604 are values adapted to the individual, are transmitted together with the sensor signal from the sensor 211, and are stored in the emotion recognition database (FIG. 16). Further, each item consists of several coefficients, and in the case of the emotion recognition database (FIG. 16), these are denoted by the coefficients 1-5 (1609-1612).

As described above, in the embodiments, by finding correlations from microphone and sensor signals, an analysis is performed as to how much interest the participants have in the meeting. By displaying this result, the activity of the participants in the meeting can be evaluated and the state of the meeting can be evaluated for persons who are not present, and by saving this information, it can be used for future log analysis.

Here, the sound captured by a microphone was used as a signal for calculating frames, but if it can be used for calculating frames, another signal such as an image captured by a camera may also be used.

Further, in the embodiments, if a signal can be captured by a sensor, it can be used for analysis, so other sensors may be used such as a gravity sensor, acceleration sensor, pH and a conductivity sensor, RFID sensor, gas sensor, torque sensor, microsensor, motion sensor, laser sensor, pressure sensor, location sensor, liquid and bulk level sensor, temperature sensor, temperature sensor, thermistor, climate sensor, proximity sensor, gradient sensor, photosensor, optical sensor, photovoltaic sensor, oxygen sensor, ultraviolet radiation sensor, magnetometric sensor, humidity sensor, color sensor, vibration sensor, infrared sensor, electric current and voltage sensor, or flow rate sensor or the like.

What is claimed is:

1. A conversational speech analyzing system, comprising:
   a data capturing unit configured to capture data of a conversation or meeting;
   a motion sensor configured to capture motion information of a person involved in the conversation or meeting; and
   a computer, including:
      a frame detection unit configured to detect frames based on the captured data, a frame being a time segment of the conversation or meeting, and wherein the frame detection unit is configured to detect a first set of frames of data associated with a first person by using a second set of frames of data associated with a second person,
      a feature extraction unit configured to extract feature information from the sensor information of the first person in the first set of frames,
      a calculation unit configured to calculate a state of the first person in the conversation or meeting, including an interest level of the first person in the meeting, and to calculate a change of the state of the first person, including a change in interest level of the first person in the meeting, and
      a display unit configured to display at least one of:
         the state of the first person involved in the conversation or meeting, including a symbol of the first person, the symbol including a circle whose radius corresponds to a quantity of comments made by the first person in the conversation or meeting found to be useful or interesting by other participants,
         a plurality of time segments forming a time series, each time segment represented by a symbol including a rectangle whose shade or color corresponds to an aggregate of interest levels of persons involved in the conversation or meeting, and
         changes of the state of the first person shown in chronological order, including a graph that corresponds to the change over time in an interest level of the first person in the conversation or meeting.

2. The conversational speech analyzing system according to claim 1,
   wherein the sensor includes an acceleration sensor.

3. The conversational speech analyzing system according to claim 1,
   wherein the data capturing unit configured to capture data includes a microphone configured to capture sound data.

4. The conversational speech analyzing system according to claim 1,
   wherein the display unit is configured to display the state of the first person.

5. The conversational speech analyzing system according to claim 4,
   wherein the display unit is configured to display the state of the first person involved in the conversation or meeting, including a symbol of the first person, the symbol including a circle whose radius corresponds to a quantity of comments made by the first person in the conversation or meeting found to be useful or interesting by other participants.

6. The conversational speech analyzing system according to claim 1,
   wherein the display unit is configured to display, in chronological order, changes of the state of the first person shown in chronological order, including a graph that corresponds to the change over time in an interest level of the first person in the conversation or meeting.

7. The conversational speech analyzing system according to claim 1,
   wherein the display unit is configured to display a plurality of time segments forming a time series, each time segment represented by a symbol including a rectangle whose shade or color corresponds to an aggregate of interest levels of persons involved in the conversation or meeting.

8. A conversational speech analyzing system, comprising:
   a data capturing unit configured to capture data of a conversation or meeting;
   a motion sensor configured to capture motion information of a person involved in the conversation or meeting; and
   a computer, including:
      a frame detection unit configured to detect frames based on the captured data, a frame being a time segment of the conversation or meeting, and wherein the frame detection unit is configured to detect a first set of frames of data associated with a first person by using a second set of frames of data associated with a second person,
      a feature extraction unit configured to extract, for the first person involved in the conversation or meeting, feature information from the sensor information in the first set of frames,
      an interest level extraction unit configured to extract an interest level, within a particular frame in the conversation, for the first person involved in the conversation or meeting, and
      a display unit configured to display at least one of:
         a symbol of the first person involved in the conversation or meeting, the symbol including a circle whose radius corresponds to a quantity of comments made by the first person in the conversation or meeting found to be useful or interesting by other participants,
         a plurality of time segments forming a time series, each time segment represented by a symbol including a rectangle whose shade or color corresponds to an aggregate of interest levels of persons involved in the conversation or meeting, and
         a graph that corresponds to the change over time in an interest level of the first person in the conversation or meeting.

9. The conversational speech analyzing system according to claim 8,
wherein the data capturing unit configured to capture data includes a microphone configured to capture sound data.

10. The conversational speech analyzing system according to claim 8,
wherein the display unit is configured to display a symbol of the first person involved in the conversation or meeting, the symbol including a circle whose radius corresponds to a quantity of comments made by the first person in the conversation or meeting found to be useful or interesting by other participants.

11. The conversational speech analyzing system according to claim 8,
wherein the display unit is configured to display a graph that corresponds to the change over time in an interest level of the first person in the conversation or meeting.

12. The conversational speech analyzing system according to claim 8,
wherein the display unit is configured to display a plurality of time segments forming a time series, each time segment represented by a symbol including a rectangle whose shade or color corresponds to an aggregate of interest levels of persons involved in the conversation or meeting.

13. A conversational speech analyzing system, comprising:
a data capturing means for capturing data of a meeting;
a motion sensing means for capturing motion information of persons involved in the meeting; and
a computing means, including:
a frame detection means for detecting frames based on the captured data, a frame being a time segment of the meeting, and wherein the frame detection means detects a first set of frames of data associated with a first person by using a second set of frames of data associated with a second person,
a feature extraction means for extracting feature information from the sensor information of the first person in the first set of frames,
a calculation means for calculating a state of the first person in the conversation or meeting, including an interest level of the first person in the meeting, and for calculating a change of the state of the first person, including a change in interest level of the first person in the meeting, and
a display means for displaying at least one of:
the state of the first person involved in the conversation or meeting, including a symbol of the first person, the symbol including a circle whose radius corresponds to a quantity of comments made by the first person in the conversation or meeting found to be useful or interesting by other participants,
a plurality of time segments forming a time series, each time segment represented by a symbol including a rectangle whose shade or color corresponds to an aggregate of interest levels of persons involved in the conversation or meeting, and
changes of the state of the first person shown in chronological order, including a graph that corresponds to the change over time in an interest level of the first person in the conversation or meeting.

14. The conversational speech analyzing system according to claim 13,
wherein the display means is for displaying the state of the first person.

15. The conversational speech analyzing system according to claim 13,
wherein the display means includes a symbol of the first person involved in the conversation or meeting, the symbol including a circle whose radius corresponds to a quantity of comments made by the first person in the conversation or meeting found to be useful or interesting by other participants.

16. The conversational speech analyzing system according to claim 13,
wherein the display means is for displaying, in chronological order, changes of the state of the first person, including a graph that corresponds to the change over time in an interest level of the first person in the conversation or meeting.

17. The conversational speech analyzing system according to claim 13,
wherein the display means is for displaying a plurality of time segments forming a time series, each time segment represented by a symbol including a rectangle whose shade or color corresponds to an aggregate of interest levels of persons involved in the conversation or meeting.

18. The conversational speech analyzing system according to claim 13,
wherein the sensing means includes an acceleration sensing means.

19. The conversational speech analyzing system according to claim 13,
wherein the data means for capturing data includes a microphone for capturing sound data.

* * * * *